(12) United States Patent
Elsing

(10) Patent No.: US 6,608,733 B2
(45) Date of Patent: *Aug. 19, 2003

(54) TWO-PLANE BALANCE FOR SPINDLE MOTORS

(75) Inventor: John W. Elsing, Edina, MN (US)

(73) Assignee: Seagate Technology LLC, Scotts Valley, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/453,679

(22) Filed: Dec. 3, 1999

(65) Prior Publication Data

US 2002/0191332 A1 Dec. 19, 2002

Related U.S. Application Data

(60) Provisional application No. 60/136,577, filed on May 28, 1999.

(51) Int. Cl.[7] ............................................... G11B 17/02
(52) U.S. Cl. .................................................. 360/99.08
(58) Field of Search .......................... 360/98.07, 98.08, 360/99.04, 99.05, 99.12, 99.09, 99.11, 99.08; 369/75.2, 251, 254; 310/262, 67 R

(56) References Cited

U.S. PATENT DOCUMENTS

| | | | |
|---|---|---|---|
| 4,721,445 A | 1/1988 | Hoffmann | 418/61 |
| 4,739,425 A | 4/1988 | Dierkes et al. | 360/97 |
| 4,889,001 A | 12/1989 | Steahly | 74/604 |
| 5,182,738 A * | 1/1993 | Yoshikawa | 369/44.14 |
| 5,237,299 A * | 8/1993 | Chandler et al. | 333/233 |
| 5,263,995 A | 11/1993 | Mogilnicki et al. | 409/131 |
| 5,422,776 A | 6/1995 | Thorson et al. | 360/98.07 |
| 5,487,640 A | 1/1996 | Shaffer | 415/119 |
| 5,495,133 A * | 2/1996 | bain et al. | 310/211 |
| 5,555,144 A | 9/1996 | Wood et al. | 360/98.08 |
| 5,621,588 A * | 4/1997 | Williams et al. | 360/98.07 |
| 6,031,310 A * | 2/2000 | Ishikawa et al. | 156/218 |
| 6,053,681 A * | 4/2000 | Mattershead | 411/195 |
| 6,094,047 A * | 7/2000 | Guzik et al. | 324/262 |
| 6,158,112 A * | 12/2000 | Kim et al. | 29/759 |
| 6,304,412 B1 * | 10/2001 | Voights | 360/98.08 |

FOREIGN PATENT DOCUMENTS

| | | | |
|---|---|---|---|
| FR | 2461855 | * | 3/1981 |
| JP | 1-166662 | * | 6/1990 |
| JP | 2000-207823 | * | 7/2000 |

* cited by examiner

Primary Examiner—Brian E. Miller
Assistant Examiner—Tianjie Chen
(74) Attorney, Agent, or Firm—Moser, Patterson and Sheridan, LLP

(57) ABSTRACT

In a spindle hub configured for rotation about an axis, through holes extend from a first end of the spindle hub to a second end of the spindle hub. The through holes are generally parallel to the axis. A method of achieving two-plane balance of a disc pack assembly by positioning one or more weights in one or more of the through holes and retaining the weight in the position, such that it is possible to access each weight from the top of the spindle hub.

8 Claims, 6 Drawing Sheets

TWO-PLANE BALANCE FOR SPINDLE MOTORS

This patent application claims priority from U.S. Provisional Application No. 60/136,577, filed May 28, 1999.

FIELD OF INVENTION

The present invention relates generally to spindle motor assemblies in disc drives, and more particularly to the balancing of disc pack assemblies.

BACKGROUND OF THE INVENTION

In a disc drive, a spindle motor assembly comprises a stationary portion and a rotary portion. The rotary portion, also referred to as the disc pack assembly, typically includes a number of discs and spacers mounted on a spindle hub. As the disc pack assembly is rotated, the lack of perfect symmetry about the axis of rotation results in vibration of the disc pack assembly. Therefore, it is necessary to balance the disc pack assembly.

For ease of reference, the end of the spindle hub which is mounted nearer a spindle base flange in the disc drive will be referred to as the bottom end, and the opposite end of the spindle hub will be referred to as the top end.

One method of balancing a disc pack assembly is described in the U.S. Pat. No. 5,555,144 issued Sep. 10, 1996, to Wood, et al. for "Balancing System for a Disc Drive Disc Assembly". This method involves mounting a C-shaped balancing clip to the disc pack assembly such that, by selecting a balancing clip with an appropriately located center of mass and selecting an appropriate orientation for the balancing clip, the disc pack assembly can be balanced.

To achieve two-plane balance, the balance at the top end and at the bottom end of the disc pack assembly are separately adjusted by mounting balancing clips to both the top and the bottom ends of the spindle hub. In the case of an "under-hub" spindle motor assembly, the bottom end does not provide access for the balancing clips to be mounted because of the way the motor magnet and the stator are arranged below the spindle hub flange.

Another approach to balancing is described in the U.S. Pat. No. 5,621,588 issued Apr. 15, 1997 to Williams, et al. for "Two-Plane Balance for Hard Disk Drive Motor-Base Assemblies." According to this method, a set of balancing screws are fastened to a top surface of the spindle hub, and another set of balancing screws are fastened to a bottom surface of the spindle hub. The spindle motor assembly is mounted on a base plate by means of mounting screws. The mounting screws are chosen to be larger than the balancing screws in order that the bottom surface of the spindle hub can be accessed from the bottom direction by removing a mounting screw.

Thus, it has been generally inconvenient and difficult to adjust the bottom-plane balance of a disc pack assembly. Therefore, there remains a need for an improved method of balancing a disc pack assembly. It will be evident from the following description that the present invention offers this and other advantages over the prior art.

SUMMARY OF THE INVENTION

According to one aspect of the invention, there is provided a spindle hub configured for rotation about an axis. The spindle hub has a plurality of through holes on the spindle hub. The through holes extend from a first end of the spindle hub to a second end of the spindle hub, in a direction generally parallel to the axis.

A weight and a through hole on the spindle hub are configured such that the weight can be inserted into the through hole from the top of the spindle hub.

In one embodiment, the weight can be fixed at different positions inside the through hole.

In another embodiment, the through hole includes a stop at the second end of the spindle hub. A retainer is configured to retain the weight in a position between the retainer and the stop.

According to another aspect of the invention, there is provided a method of balancing a disc pack assembly. The method includes providing a spindle hub having a plurality of through holes extending from a first end to a second end of the spindle hub in a direction generally parallel to the axis. The method also includes a step of positioning a weight within one of the through holes.

The method may further include a step of retaining the weight in a position within the through hole.

The present invention therefore provides for an improved method of achieving two-plane balance in a disc pack assembly. The invention also provides an easier way of adjusting the bottom-plane balance. In addition, it facilitates the implementation of a more efficient manufacturing system as it does not require robots to access the disc pack assembly from both the top and bottom directions.

DETAILED DESCRIPTION

Figure 1:
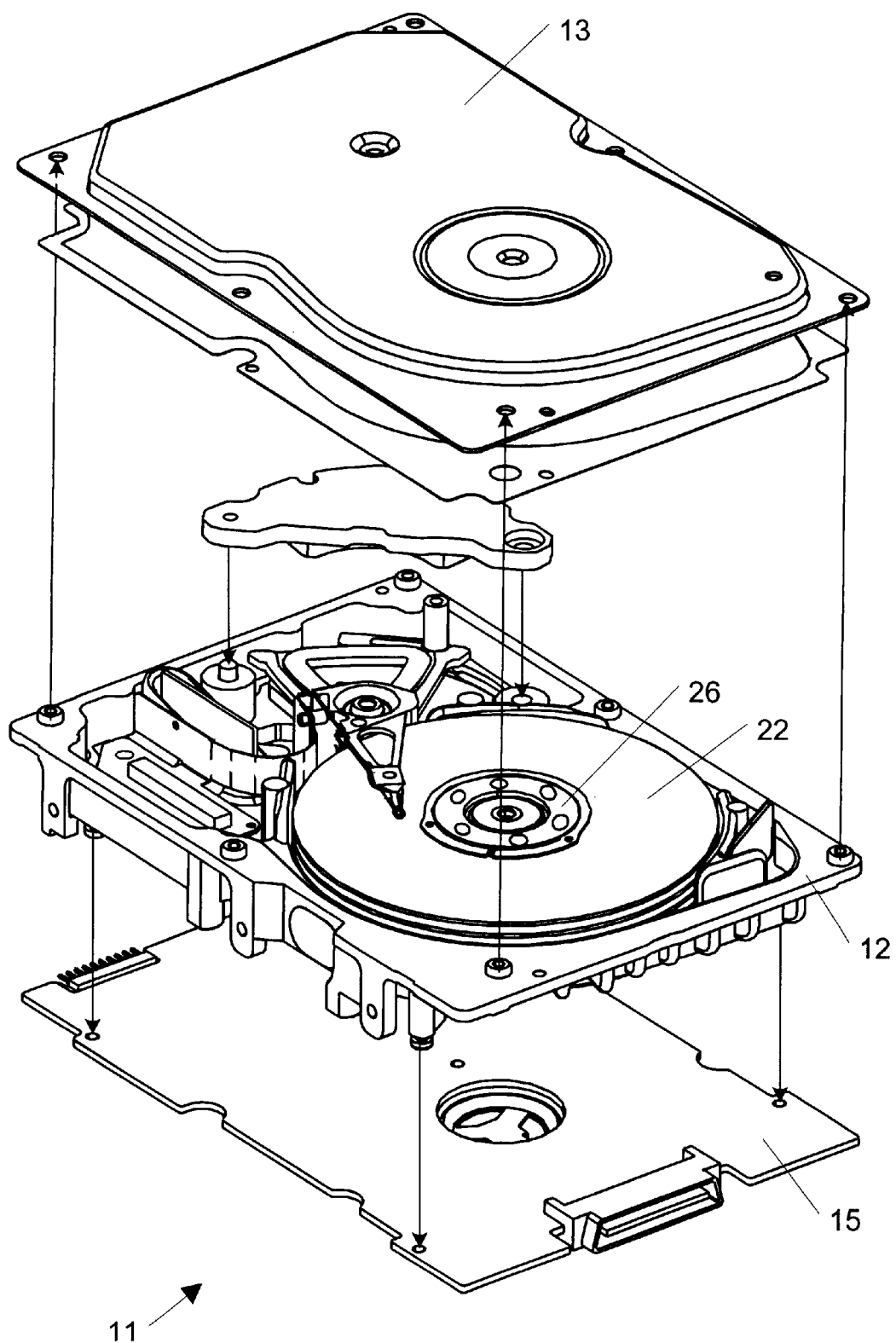
FIG. 1 shows an exploded view of a disc drive.

FIG. 1 is an exploded view of a disc drive 11 with a deck 12 between a top cover 13 and a controller board 15. Discs 22 are shown in assembly with a clamp ring 26. The discs 22 are mounted on a spindle hub 20 which is hidden from view below the clamp ring 26.

Figure 2:
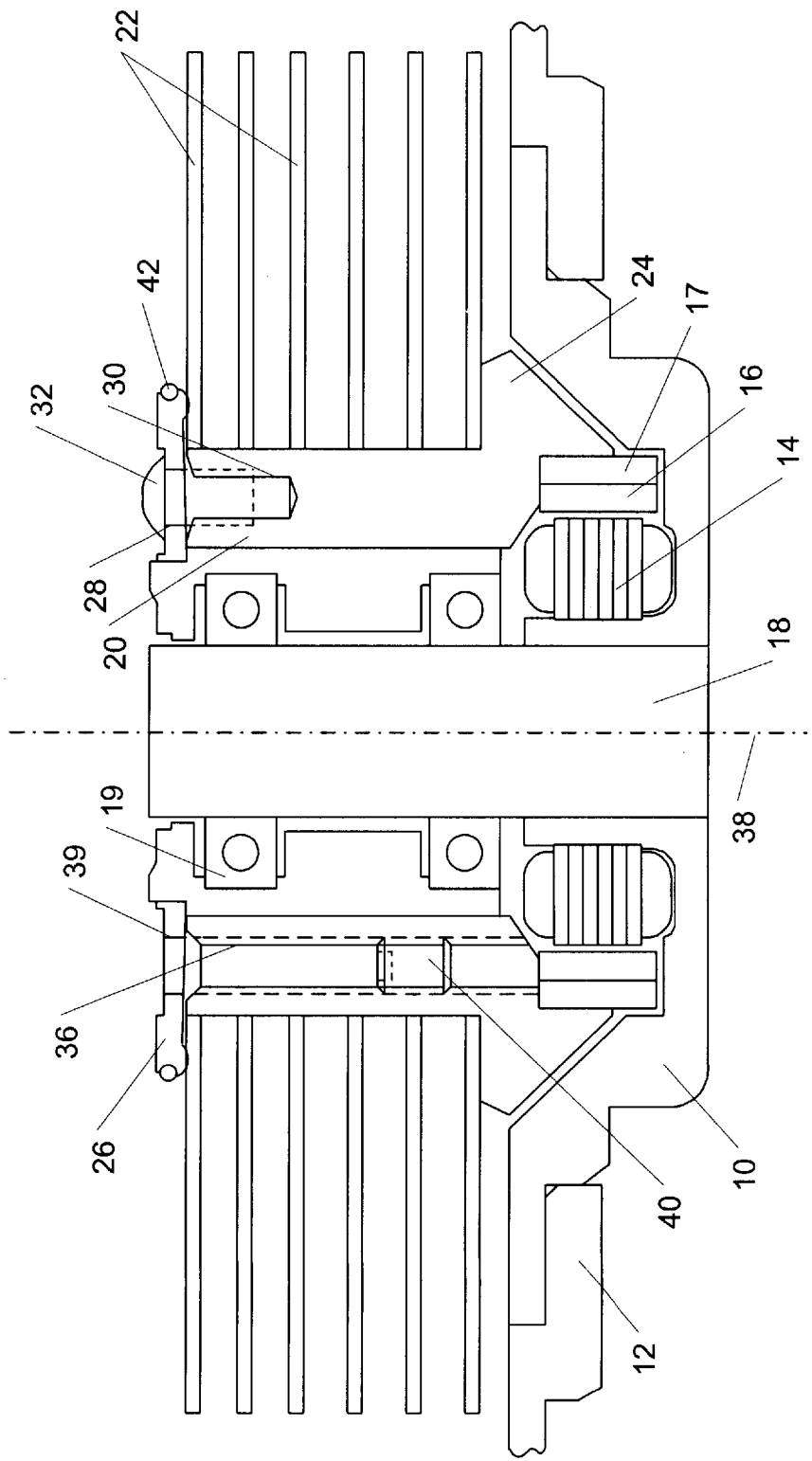
FIG. 2 is a cross-section showing a preferred embodiment of the invention as applied to an "under-hub" spindle motor assembly.

As a preferred embodiment of the invention is described with reference to FIG. 2, it can be seen that the present invention allows a spindle motor assembly to be assembled from the bottom up, with a robot accessing the assembly from only the top direction.

The spindle base flange 10 is first mounted to the deck 12 of the disc drive 11. Stator 14 and magnet 16 are located about a shaft 18 of the spindle motor, above the spindle base flange 10. The magnet 16 and back-iron 17 are attached to a spindle hub 20 which is assembled to the rest of the spindle motor such that it is free to rotate about the shaft 18 through the bearing means 19.

A series of discs 22 are loaded, from the top, onto the spindle hub 20. The discs 22 are typically interspersed by spacers (not shown) and secured to the spindle hub 20 by some mounting device so that the discs 22 rotate with the spindle hub 20 about the shaft 18 when the disc drive is in operation.

In conventional systems, the bottom-plane balance of the disc pack is difficult to adjust because the arrangement of the spindle base flange 10 does not provide easy access to the spindle hub flange 24 for balance weight access. It can be seen from the FIG. 2 that it would be difficult to put in place a C-shaped balancing clip at the spindle hub flange 24 from either the side or the top of the disc pack assembly.

A clamp ring 26 is fitted at the top end of the spindle hub 20 such that it holds down the discs 22. The clamp ring 26 usually has six first clamp ring holes 28 which correspond to six clamp ring screw holes 30 on the top surface of the spindle hub 20 so that the clamp ring 26 can be secured to the spindle hub 20 by means of six clamp ring screws 32.

According to a preferred embodiment of the present invention, a through hole 36 is located in the spindle hub 20 such that it extends from a top surface of the spindle hub 20 to a bottom surface of the spindle hub 20. For illustrative purposes only, the FIG. 2 shows one arrangement of the through holes 36 in an "under-hub" spindle motor. Other possible arrangements of the through holes 36 are shown in the context of an "in-hub" spindle motor in FIG. 6.

Figure 4:
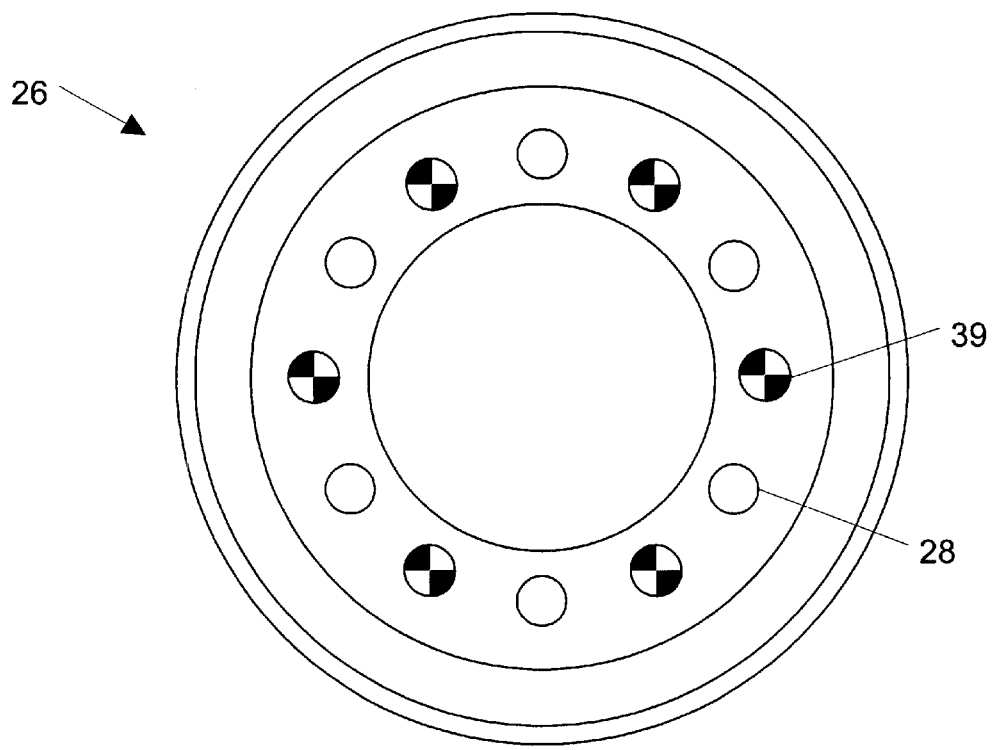
FIG. 4 is a top view of a clamp ring.

Preferably, through holes 36 are situated in the spindle hub 20 so that the spindle hub 20 has rotational symmetry about an axis 38 of the shaft 18. In a most preferred embodiment, six through holes 36 are situated on the hub 20 between the clamp ring screw holes 30 such that they are equidistant from one another. A corresponding second clamp ring hole 39 may be required in the clamp ring 26 if the through hole 36 is arranged such that it is covered by the clamp ring 26 when the disc pack assembly is completed. FIG. 4 shows a top view of such a clamp ring 26 with one arrangement of the first clamp ring holes 28 and the second set of clearance clamp ring holes 39, constructed to correspond to the clamp ring screw holes 30 and the through hole 36, respectively. The same figure also provides an indication of one arrangement of the through holes 36, relative to the clamp ring screw holes 30, on the spindle hub 20.

A weight 40 is configured such that it can be inserted into one of the through holes 36 from the top of the spindle hub 20 and be moved from the top of the spindle hub 20 along the through hole 36 to the bottom of the spindle hub 20.

Figure 3:
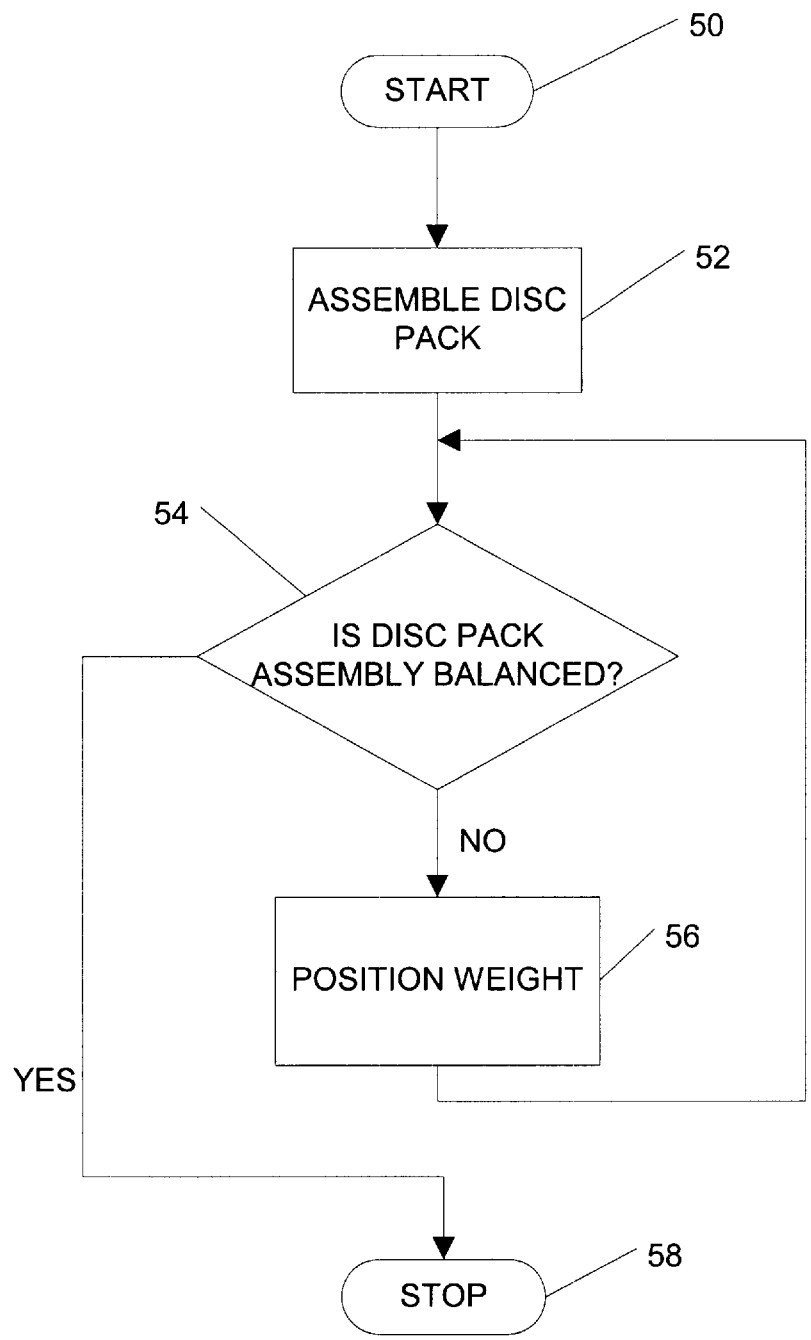
FIG. 3 is a flowchart showing a method of balancing a disc pack assembly according to one embodiment of the invention.

Making reference to FIG. 3, the procedure for balancing starts 50 after the disc pack is assembled 52 onto the stationary portion of the spindle motor. The disk pack assembly is then checked for imbalance 54. If the disc pack assembly is not balanced, a computer can be used to determine where one or more weights 40 and/or 42 should be positioned. The required weights 40 are then inserted into the appropriate through holes 36 and moved to the desired position 56. The balance of the disc pack assembly may be verified 54 before the procedure is ended 58 when the desired degree of balance has been achieved. The steps of checking the imbalance 54 and of positioning appropriate weights 56 can be repeated, if so desired.

Because each weight 40 can be positioned anywhere along the length of a through hole 36, the balance of the disc pack assembly can be changed in smaller steps. This embodiment of the present invention therefore has an additional advantage of improving the degree to which the balance can be fine-tuned. Furthermore, it also allows for a closer match to the desired degree of balance in a single round of balancing.

Another advantage of this embodiment is that the balance of the disc pack assembly in both the top-plane and the bottom-plane can be adjusted by changing the position of the weight 40 in the through hole 36. With the aid of a computer which identifies where a weight 40 should preferably be positioned in a through hole 36, the disc pack assembly can be balanced in a single positioning step 56.

In a preferred embodiment of the invention, the through holes 36 and the weights 40 are threaded so that each weight 40 can be made to travel along the length of the through hole 36 by means of a torx driver, an allen driver or other such like tool.

Figure 5:
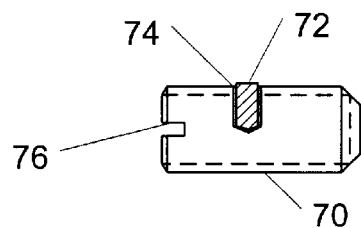
FIG. 5 shows an example of a nylock-type screw.

Preferably, the weight 40 is configured such that it will not change position after the desired balance is achieved. One preferred embodiment uses nylock-type screws for the weights 40. One example of a nylock-type screw is illustrated schematically in FIG. 5. It is shaped like a setscrew with an external thread 70 chosen to correspond with an internal thread of the through hole 36. A piece of elastic material 72 resides in a cavity 74 such that part of the elastic material 72 protrudes out from the threads of the screw. The top end of the nylock-type screw has features 76 to allow for engagement by a torx driver, an alien driver or other such like tool. When the nylock-type screw is not being threaded along the through hole 36, the elastic material 72 holds the nylock-type screw securely fitted in the through hole 36.

Figure 6:
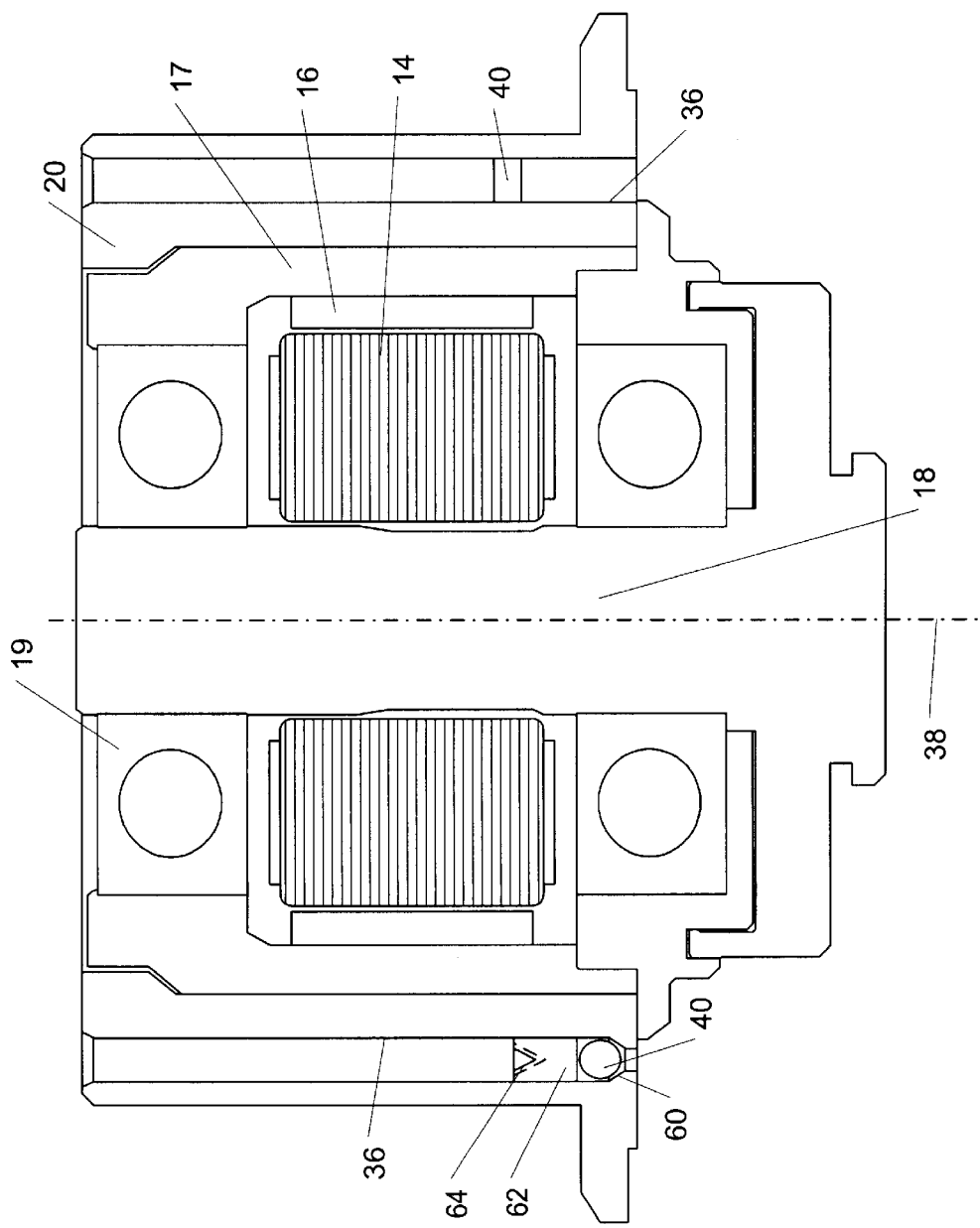
FIG. 6 shows further embodiments of the invention as applied to an "in-hub" spindle motor assembly.

Further embodiments of the present invention are illustrated in FIG. 6. Referring to the right-hand half of the figure, the weight 40 may be a ball or cylinder of steel, lead, tungsten or other suitable materials, configured for interference fit with the through hole 36. If a cylindrical shape is used, the cylinder may be constructed of different lengths as required to achieve the desired balance. The weight 40 in this case can be pushed as near the bottom of the through hole 36 as desired, and it will remain in that position even when the disc drive 11 is in operation.

In yet another embodiment of the invention, which can also be illustrated by the right-hand half of FIG. 6, the weight 40 is configured for loose fit with the through hole 36. A robot can be programmed and arranged to access the through hole 36 from the top of the spindle hub 20 and move the weight 40 in either direction inside the through hole 36. Glue can be applied to the weight 40 to secure it in a desired final position.

In another example, the disc pack assembly may be fitted with a weight 40 in each of the through holes 36 such that all the weights 40 are at the bottom of the spindle hub 20 at the beginning of the balancing procedure. To adjust the balance, one or more of the weights are accessed from the top of the spindle hub 20 and moved away from the bottom of the spindle hub 20. Preferably, the weights 40 are never completely removed from the hub 20 so as to reduce the possibility of accidentally dropping a weight 40 and damaging the discs 22. The initial positions of the weights can, of course, vary from this example without going beyond the scope of the invention.

The left-hand half of FIG. 6 shows an alternative embodiment of the present invention where the through hole 36 includes a stop 60 at the bottom end of the spindle hub. A weight 40 which is configured for loose fit with the through hole 36 can be inserted into the through hole 36 from the top of the spindle hub 20. The stop 60 may be formed as a constriction or a tab which will prevent the weight 40 from moving out of the through hole 36 at the bottom end of the spindle hub 20.

A retainer 62 can be used to retain the weight 40 at the bottom of the through hole 36. A suitable retainer 62 is likely to be much lighter than the weight 40 so as not to influence the balance of the disc pack assembly. One example of a retainer 62 is molded from a resilient material and sized a little larger than the through hole 36 such that when it is inserted into the through hole 36, a press fit is created between the retainer 62 and the through hole 36. A retainer 62 can be shaped like a cylinder, or preferably it may have a square profile or a wavy profile so that it is easier to fit into the through hole 36.

In another embodiment, the retainer 62 may include an internally threaded hole 64 by which the retainer 62 can be secured by a tool and removed from the through hole 36. The weight 40 can then be dumped out of the through hole 36 and the disc pack can be sent for rework. Preferably, the internally threaded hole 64 is tapered.

Figure 7:
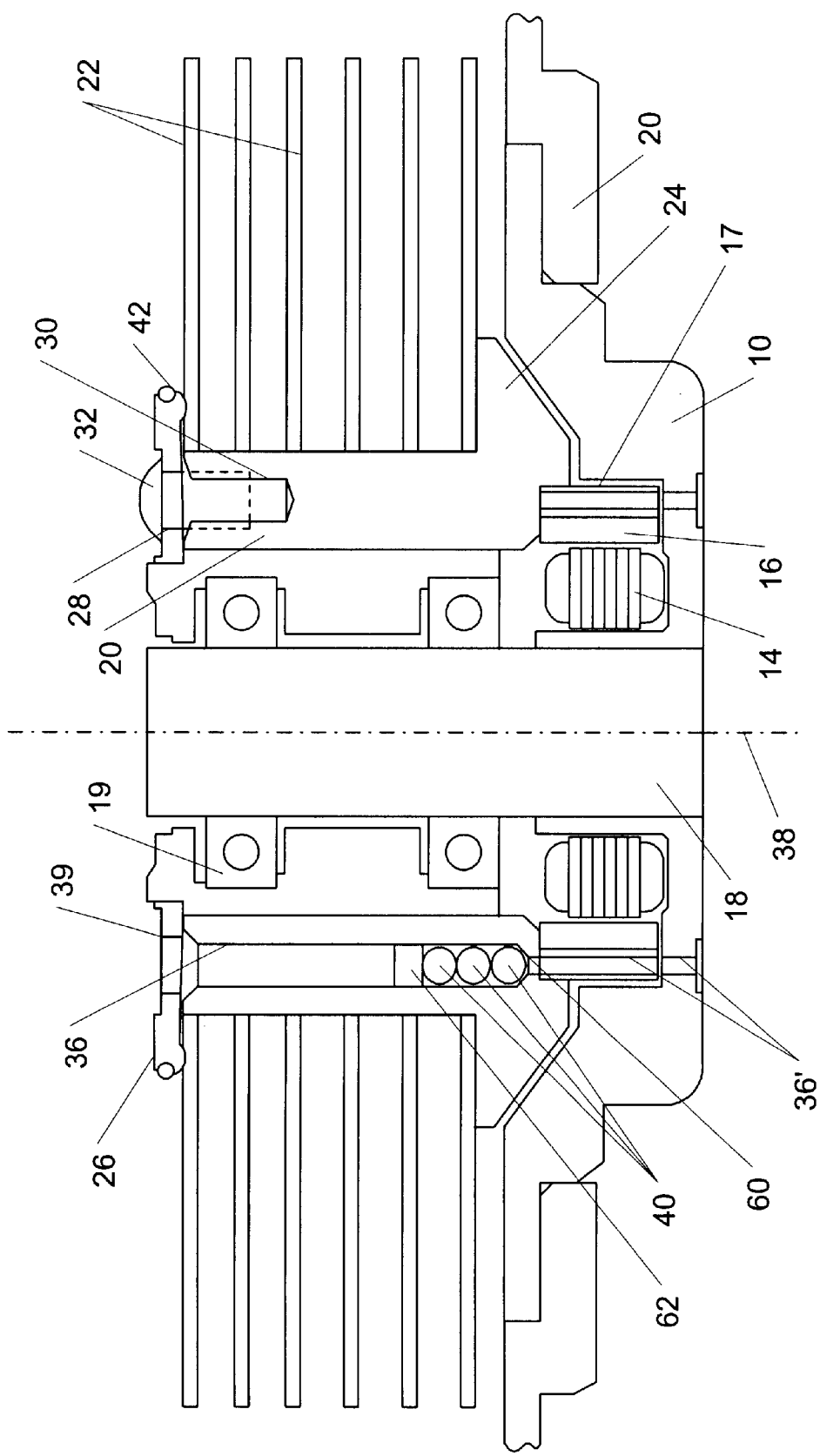
FIG. 7 is a cross-section of a spindle motor showing an extended through hole.

Alternatively, as shown in FIG. 7, the through hole 36 is extended through the back-iron 17 and the spindle base flange 10. The extended hole 36' allows a rod to be inserted from the bottom direction such that the weight and retainer, if any, are pushed up and out of the spindle hub 20 if removal of the weight becomes necessary, for example, in the case of rework.

A person skilled in the art will understand that the present invention can be applied in different ways without going beyond the scope of the invention. For example, as shown in FIG. 2, one embodiment of the present invention also allows for a C-shaped balancing clip 42 to be fitted to the clamp ring 26 to provide some adjustment of the top-plane balance, if so desired.

The present invention is not limited to the case where one weight 40 is located in each through hole 36. According to the adjustments required to achieve the desired balance, more weights 40 can be added to one through hole 36, as shown in FIG. 7, or a particular through hole 36 may not need to have a weight 40 in it.

The person skilled in the art will also understand that the size and number of through holes 36 as well as the dimensions of the weights 40 can also be varied without going beyond the scope of the present invention.

As mentioned in the foregoing, a computer can be programmed to determine the top-plane and bottom-plane balance of the hub assembly so that each weight 40 can be moved to an appropriate position and the desired balance can be achieved quickly. This however, does not preclude the situation where an operator adjusts the balance manually.

Various embodiments of the present invention are further described below.

A spindle hub 20 is configured for rotation about an axis 38. The spindle hub 20 includes a first end and a second end. The spindle hub 20 also includes through holes 36 such that the through holes 36 extend from the first end to the second end in a direction generally parallel to the axis 38.

The spindle hub 20 may further include a weight 40 inside one of the through holes 36. The weight 40 and the through hole 36 are configured such that the weight 40 can be fixed at different positions along the through hole 36.

In one embodiment, the weight 40 and the through hole 36 are configured for interference fit with each other.

In another embodiment, the weight 40 has an external thread cooperative with the internal thread of the through hole 36.

In one embodiment, the weight is a nylock-type screw.

In another embodiment, the through hole 36 includes a stop 60 at the second end of the spindle hub 20.

The weight 40 may be positioned in the through hole 36 at the stop 60.

In one embodiment, the weight 40 is retained in a position between a retainer 62 and the stop 60.

The retainer 62 and the through hole 36 may be configured for press fit with each other.

The retainer 62 may further include an internally threaded hole 64 such that when the retainer 62 is inside the through hole 36, the internally threaded hole 64 is accessible from the first end of the spindle hub 20.

The through holes 36 may be positioned on the spindle hub such that they are equidistant from one another.

A method of balancing a disc pack assembly which includes providing a spindle hub 20 as described above, and positioning a weight 40 within one of the through holes 36.

The positioning step may be carried out by accessing the weight from only the first end of the spindle hub.

The method may further include a step of retaining the weight 40 in a position within the through hole 36.

The method of retaining the weight may be carried out by accessing the disc pack assembly from only the first end of the spindle hub.

In one embodiment, the method includes a step of determining the imbalance of the disc pack assembly.

The method performed such that two-plane balance of the disc pack assembly is achieved.

Therefore, it can be understood that the present invention makes it possible for two-plane balance of an assembly to be adjusted without requiring access from both the top and bottom directions of the assembly. It follows that the invention offers an improved method of adjusting the two-plane balance of an assembly, especially when there is some difficulty gaining access to the bottom of the assembly. It also offers other advantages by reducing constraints in the method of manufacturing the assembly, for example, by making it possible to assemble and balance the assembly while gaining access to the assembly from only one direction.

The foregoing description is only illustrative of various embodiments of the invention, and a person skilled in the art will understand that changes can be made to the details of structure, function and processes without going beyond the scope of the present invention.

What is claimed is:

1. A spindle hub for receiving at least one disc configured for rotation about an axis, the spindle hub comprising:
    a first end;
    a second end;
    a plurality of through holes on the spindle hub such that the through holes extend from the first end to the second end in a direction generally parallel to the axis, wherein said through holes extend at least an axial distance that is defined relative to a position above a highest of said at least one disc and a position below a lowest disc of said at least one disc;
    at least one weight in one particular of the plurality of through holes, wherein the weight is configured such that the weight can be positioned in the particular through hole at a stop; and
    a retainer in the particular through hole configured to retain the weight in a position between the retainer and the stop.

2. A spindle hub of claim 1 wherein the stop is located at the second end of the spindle hub.

3. A spindle hub of claim 1 wherein the retainer and the particular through hole are configured for press fit or clearance with each other.

4. A spindle hub of claim 1 wherein the retainer includes an internally threaded hole configured such that when the retainer is in the particular through hole, the internally threaded hole is accessible from the first end of the spindle hub.

5. A spindle hub of claim 1 wherein said at least one weight is loosely fit within a particular through hole such that when the retainer is removed, the weight may be dumped out of the particular through hole so that the spindle hub may be reworked.

6. A spindle hub of claim 1 mounted on a fixed spindle base flange and further including:

at least one flange through hole mounted in said spindle base flange so as to permit a rod to be inserted through the fixed spindle based flange to push the weight and retainer out of the spindle hub if removal of the weight becomes necessary.

7. A spindle hub of claim 6 further including
   a back iron; and
   wherein said plurality of through holes extend through said back iron.

8. A disc drive comprising:
   a disc pack assembly having a spindle hub for receiving at least one disc and for rotation about an axis; and
   means for balancing the disc pack assembly, wherein said means comprises a plurality of through holes on the spindle hub such that the through holes extend from a first end to a second end in a direction generally parallel to the axis, wherein said through holes extend at least an axial distance that is defined relative to a position above a highest of said at least one disc and a position below a lowest of said at least one disc.

* * * * *